(12) United States Patent
Kosaka et al.

(10) Patent No.: US 6,608,118 B2
(45) Date of Patent: Aug. 19, 2003

(54) MELAMINE MOLDED FOAM, PROCESS FOR PRODUCING THE SAME, AND WIPER

(75) Inventors: Yukishiro Kosaka, Anjo (JP); Genjiro Hattori, Anjo (JP); Hidero Suzuki, Hadano (JP); Satoshi Kondo, Anjo (JP); Masahiro Fukuyama, Anjo (JP); Atsushi Ichinose, Anjo (JP)

(73) Assignee: Inoac Corporation, Aichi (JP)

( * ) Notice: Subject to any disclaimer, the term of this patent is extended or adjusted under 35 U.S.C. 154(b) by 0 days.

(21) Appl. No.: 10/083,152

(22) Filed: Feb. 27, 2002

(65) Prior Publication Data

US 2002/0163105 A1 Nov. 7, 2002

(30) Foreign Application Priority Data

Feb. 28, 2001 (JP) ........................................ 2001-055817

(51) Int. Cl.$^7$ .................................................. C08J 9/00
(52) U.S. Cl. ........................................ 521/187; 264/321
(58) Field of Search ........................... 264/321; 521/187

(56) References Cited

U.S. PATENT DOCUMENTS

| 4,334,971 A | * | 6/1982 | Mahnke et al. |
| 4,511,678 A | * | 4/1985 | Mahnke et al. |
| 4,540,717 A | * | 9/1985 | Mahnke et al. |

* cited by examiner

*Primary Examiner*—Morton Foelak
(74) *Attorney, Agent, or Firm*—Sughrue Mion, PLLC

(57) ABSTRACT

A melamine molded foam is produced by heat-compressing a melamine foam to a thickness of $1/1.2$ to $1/12$ to cause plastic deformation and temporarily fixing the shape; the heat-compression is performed under the conditions of from 210 to 350° C. for 3 minutes or longer; the heat-compression is preferably performed at a temperature within the range of lower than the decomposition temperature of the melamine monomer by 140° C. or less; in some of such molded foams, the shape recovery in the direction of thickness with the lapse of time is observed depending upon the heat-compression conditions; and the dimensional recovery ratio is 40% or less when allowed to stand at 23° C. for 200 hours.

10 Claims, 2 Drawing Sheets

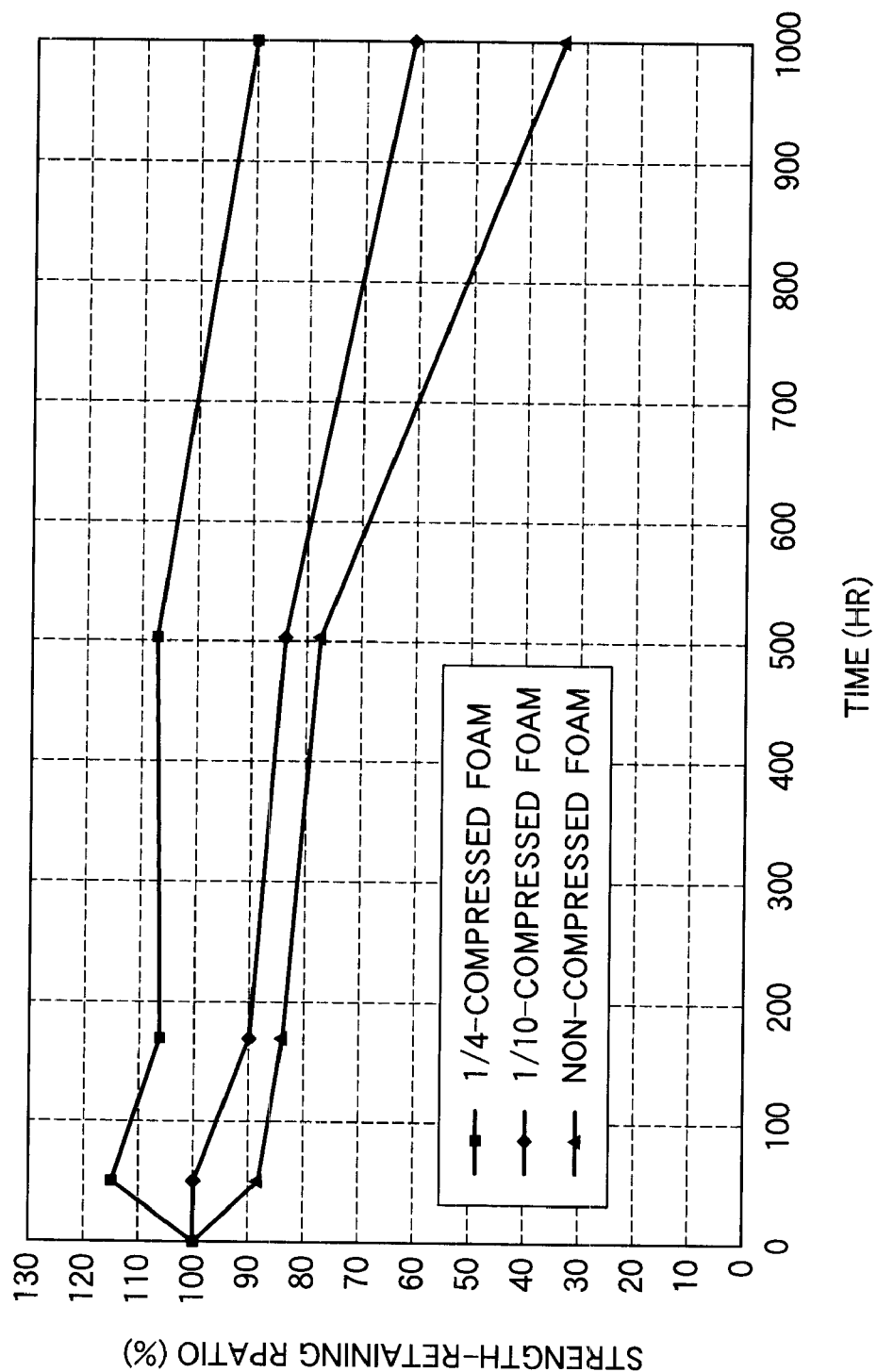

MELAMINE MOLDED FOAM, PROCESS FOR PRODUCING THE SAME, AND WIPER

FIELD OF THE INVENTION

The present invention relates to a melamine molded foam having a reduced fragility by improving strength, a good workability, and an enough resistance to moist heat aging and to a process for producing the same. In addition, the invention relates to a wiper having a washing portion comprising the melamine molded foam and having an excellent durability. The melamine molded foam of the invention can be used for various uses requiring heat-insulating properties, sound attenuation or electrically insulating properties as well as for the wiper. In particular, it is useful for the uses which require heat resistance or resistance to moist heat aging as well as heat-insulating properties such as engine room of automobiles and electrical home appliances (e.g., an electric rice cooker, a hot water supply system, a quilt drier and an oven toaster), which require heat resistance or resistance to moist heat aging as well as lagging properties such as a warm water-supplying pipes from boilers, or which require heat resistance or resistance to moist heat aging as well as sound absorbing qualities such as a microwave oven.

BACKGROUND OF THE INVENTION

A floor cloth has conventionally been used for wiping the dust off a table and, in the case of washing tableware or a bath tab, an urethane foam or a cellulose sponge has been used. In some cases, however, dirt can not sufficiently be removed even when a detergent is used. Or, when rubbed too strongly, the rubbed surface to be washed might be damaged or suffer reduction in luster. Thus, wipers comprising a melamine foam excellent in washing off dirt have been proposed and have been put into practice. However, the melamine foam involves the problem that, since it is fragile due to its insufficient strength, it comes off in a particulate form when rubbed against the surface to be washed and the particles damage the surface similarly with the urethane foam.

In spite of its excellent heat resistance and its thermally stable properties, the melamine foam is in some cases limited as to its use due to this fragility and generation of reject articles resulting from the fragility. Further, although the fragility may not cause a serious problem in the use of heat-insulating materials and lagging materials, those materials which are exposed to a moist heat atmosphere such as lagging materials for warm water-supplying pipes from boilers suffer reduction in strength, thus so-called resistance to moist heat aging being important. Additionally, Japanese Patent Laid-Open No. 26054/1995 discloses a melamine foam having decreased fragility, which, however, is still insufficient and, in addition, it is not investigated therein to improve resistance to moist heat aging. Further, Japanese Patent Laid-Open No. 152848/1981 discloses a process for producing a melamine/formaldehyde elastic foam having a low density by heating for removing water, etc., but refers to nothing as to heat compression.

SUMMARY OF THE INVENTION

The invention solves the problems with the conventional products described above, and an object of the invention is to provide a melamine molded foam having a reduced fragility by improving strength, a good workability, and an enough resistance to moist heat aging and a process for producing the same. In addition, the other object of the invention is to provide a wiper having a washing portion comprising the melamine molded foam, showing an excellent dirt-removing ability without damaging the surface to be washed, and having an excellent durability.

It was tried to heat-compress a melamine foam to thereby increase its strength for reducing its fragility. First, as is the same with urethane foams which can easily be heat-molded, the melamine foam was heat-compressed at about 160 to about 180° C. However, the heat-compressed foam easily recovered to the thickness before the heat compression with time at room temperature, thus a compressed molded foam not being produced. Then, the molding was conducted at a temperature within a higher specific range generally not being employed in the field of heat molding a resin foam. This time, sufficient plastic deformation of the melamine foam was attained, and there was obtained a melamine molded foam having an improved strength and a reduced fragility.

The invention has been completed based on the finding.

The above objects of the invention have been achieved by a melamine molded foam, a process for producing a melamine molded foam and a wiper each having the constitution described below:

(1) A melamine molded foam, wherein melamine foam is in a state of being heat-compressed to cause plastic deformation;

(2) The melamine molded foam as described in (1), wherein the melamine foam is compressed to a thickness of $1/1.2$ to $1/12$;

(3) The melamine molded foam as described in (1) or (2), which shows a dimensional recovery ratio of 40% or less when allowed to stand at 23° C. for 200 hours;

(4) The melamine molded foam as described in one of (1) to (3), which has an uneven area in at least part of the surface thereof;

(5) A process for producing a melamine molded foam, which comprises heat-compressing a melamine foam at 210 to 350° C. for 3 minutes or longer to cause plastic deformation;

(6) A process for producing a melamine molded foam, which comprises heat-compressing a melamine foam at a temperature lower than the decomposition temperature of the melamine monomer constituting the melamine foam by 140° C. or less for 3 minutes or longer to cause plastic deformation;

(7) The process for producing a melamine molded foam as described in (5) or (6), wherein the melamine foam is compressed to a thickness of $1/1.2$ to $1/12$;

(8) The process for producing a melamine molded foam as described in one of (5) to (7), wherein the heat-compression molding is conducted in a metal mold having an uneven area in at least part of the molding surface with the melamine foam in contact with the uneven area-containing molding surface;

(9) The process for producing a melamine molded foam as described in one of (5) to (7), wherein the heat-compression molding is conducted with the melamine foam in contact with the uneven area-containing surface of a molding attachment which has the at least partly uneven surface;

(10) A wiper having a washing portion comprising the melamine molded foam described in one of (1) to (4); and

(11) The wiper as described in (10), which has the above-described washing portion and a multi-layer structure.

BRIEF DESCRIPTION OF THE DRAWINGS

FIG. 1 is a graph showing relation between the moist heat aging time and the strength-retaining ratio in the case of exposing the melamine molded foam to a moist heat aging atmosphere.

DESCRIPTION OF THE REFERENCE NUMERALS

Figure 2A:
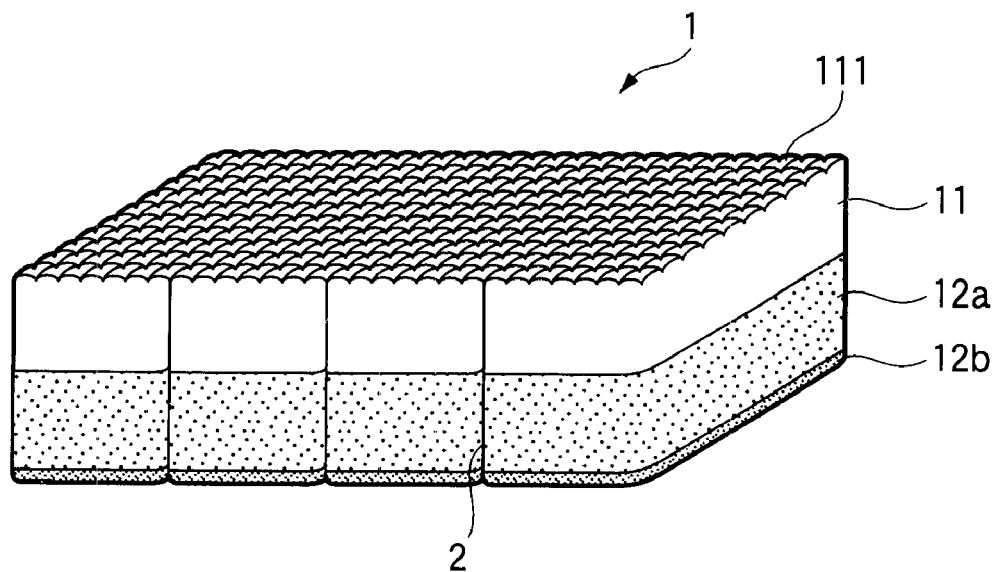
FIG. 2A is a perspective view showing an example of applying the melamine molded foam to a wiper.

1: Wiper
111: Uneven area
11, 11a, 11b: Melamine foam layer
12, 12a, 12b: Urethane sponge layer
2: Notches

DETAILED DESCRIPTION OF THE INVENTION

The melamine molded foam of the first aspect of the invention comprises a melamine foam heat-compressed to attain plastic deformation.

The "melamine foam" described above can be prepared by blending major starting materials of melamine and formaldehyde, or a precursor thereof, with a blowing agent, a catalyst and an emulsifier, injecting the resultant mixture into a mold, and making the reaction mixture generate heat through a proper means such as heating or irradiation with electromagnetic wave to cause foaming and curing. The molar ratio of melamine to formaldehyde (i.e., melamine:formaldehyde) for producing the precursor is preferably 1:1.5 to 1:4, particularly preferably 1:2 to 1:3.5 in melamine:formaldehyde. In addition, number average molecular weight of the precursor is preferably 200 to 1,000, particularly preferably 200 to 400. Additionally, formalin which is an aqueous solution of formaldehyde is usually used as formaldehyde.

As monomers for producing the precursor, the following various monomers may be used in an amount of 50 parts by weight (hereinafter abbreviated as "parts") or less, particularly 20 parts by weight or less, per 100 parts by weight of the sum of melamine and formaldehyde in addition to melamine and formaldehyde. As other monomers corresponding to melamine, there may be used $C_{1-5}$ alkyl-substituted melamines such as methylolmelamine, methylmethylolmelamine and methylbutylolmelamine, urea, urethane, carbonic acid amides, dicyandiamide, guanidine, sulfurylamides, sulfonic acid amides, aliphatic amines, phenols and the derivatives thereof. As aldehydes, there may be used acetaldehyde, trimethylol acetaldehyde, acrolein, benzaldehyde, furfurol, glyoxal, phthalaldehyde, terephthalaldehyde, etc.

As the blowing agent, there may be used pentane, trichlorofluoromethane, trichlorotrifluoroethane, etc. However, use of so-called fleons® such as trichlorofluoromethane is regulated from the point of view of environmental problems, thus not being preferred. On the other hand, pentane is preferred in that it easily provides a foam when used even in a small amount but, since it has a volatile flammability, it requires sufficient care in its handling. Further, as the catalyst, formic acid is commonly used and, as the emulsifier, anionic surfactants such as sodium sulfonate may be used.

The amount of the electromagnetic wave to be irradiated for accelerating the curing reaction of the reaction mixtures is preferably adjusted to be 500 to 1,000 kW, particularly 600 to 800 kW, in electric power consumption based on 1 kg of an aqueous formaldehyde solution charged in the mold. In case when this electric power consumption is insufficient, there results an insufficient foaming, leading to production of a cured product with a high density. On the other hand, in case when the electric power consumption is excessive, the pressure upon foaming becomes seriously high, leading to serious exhaustion of the mold and even the possibility of explosion. Thus, electric power consumption outside the range is not preferred.

The method of "heat compression" for producing the above-described "melamine molded foam" from the melamine foam is not particularly limited as long as it can cause "plastic deformation" of the melamine foam. However, a method of heat-compressing between hot plates of a compression molding machine is commonly employed.

Additionally, the melamine foam to be subjected to the compression molding may be either a slab foam obtained in an open mold or a mold foam obtained in a closed mold.

The melamine molded foam is preferably formed by compressing the melamine foam to a thickness of $1/1.2$ to $1/12$ as in the second aspect of the invention. That is, the ratio of the thickness of the melamine foam after heat-compression to the thickness of the melamine foam before heat-compression (which is hereinafter referred to as "degree of compression") is from $1/1.2$ to $1/12$. In case when the degree of compression is too small, there might result a molded foam with an insufficient strength and an insufficiently reduced fragility. On the other hand, in case when the melamine foam is compressed to a thickness as thin as less than $1/12$, i.e., in case when the degree of compression is too large, there tends to result an insufficient resistance to moist heat aging. The molded foam is formed by compressing the melamine foam to a thickness of preferably $1/1.5$ to $1/7$, more preferably $1/2$ to $1/7$. Compression to a thickness of this range can provide a melamine molded foam having a sufficiently reduced fragility and an excellent resistance to moist heat aging.

The melamine molded foam can be formed by plastically deforming a melamine foam. When the melamine foam can be completely plastically deformed by heat-compression, its shape and dimension will not greatly recover. Furthermore, such a molded foam has been actually obtained. However, the dimensional change in the direction of thickness with the lapse of time is observed depending upon the heat-compression conditions. The degree of shape recovery is evaluated by a value calculated according to the following formula.

$$\text{Dimensional recovery ratio } (\%) = \frac{H_2 - H_1}{H_1} \times 100$$

In the formula, $H_1$ represents a thickness after compression and $H_2$ represents a thickness after shape recovery with the lapse of time. As in the third aspect of the invention, the dimensional recovery ratio is preferably 40% or less after being allowed to stand at 23° C. for 200 hours.

The melamine molded foam preferably has an uneven area in at least part of the surface thereof as in the fourth aspect of the invention. In this case, the heat-insulating properties and the sound attenuation properties can be improved. Particularly, in the case of using as a wiper, there can be obtained an excellent rub-cleaning properties. This may be attributed to that the uneven area in the surface of the molded foam with a high strength catches the fine unevenness formed by the dirt existing on the stained surface and exerts an action of strongly scratching the dirt on the stained surface.

The process for producing the melamine molded foam, which is the fifth aspect of the invention, comprises heat-compressing a melamine foam at 210 to 350° C. for 3 minutes or longer to thereby cause plastic deformation.

In case when the temperature of heat compression in this process is lower than 210° C., there occurs a dimensional recovery of more than 40% in the dimensional recovery ratio, for example, about 10 to 20 days after the heat compression, thus strength of the molded foam not being sufficiently improved and fragility not being reduced. On the other hand, in case when the temperature is higher than 350° C., the molded foam might suffer burning or discoloration to be tinged with brown or a brownish color, and the melamine foam might be decomposed. The heat-compressing temperature is preferably 220 to 290° C., particularly preferably 230 to 280° C., still more preferably 240 to 270° C. Heat compression at a temperature within the range serves to sufficiently improve strength and reduce fragility without causing burning or discoloration and decomposition of the foam.

Also, in case when the heat compression is conducted for shorter than 3 minutes, plastic deformation can not be completed, and the molded foam undergoes elastic recovery, thus strength of the molded foam not being improved and fragility not being reduced. On the other hand, even when the heat-compressing time is longer, there arises particularly no problems with respect to the properties of the molded foam. However, heat compression for a time longer than necessary is useless. The time for heat compression is preferably 3 to 20 minutes, more preferably 5 to 20 minutes, still more preferably 8 to 17 minutes. Heat compression conducted for a time within the range serves to cause sufficient plastic deformation of the foam, thus strength of the molded foam being sufficiently improved and fragility being reduced.

The process for producing the melamine molded foam, which is the sixth aspect of the invention, comprises heat-compressing a melamine foam at a temperature lower than the decomposition temperature of the melamine monomer for forming the melamine foam by 140° C. or less for 3 minutes or longer to thereby cause plastic deformation.

Additionally, the decomposition temperature of the melamine monomer is a temperature at which melamine ($C_3H_6N_6$; 2,4,6-triamino-1,3,5-triazine) is sublimed or decomposed. Therefore, when the decomposition temperature is 350° C., the above-described temperature range is 210 to 350° C.

In case when heat compression in the process is conducted at a temperature lower than the predetermined level, there results a large dimensional recovery, thus strength of the molded foam not being sufficiently improved and fragility thereof not being reduced. On the other hand, in case when heat compression is conducted at a temperature higher than the predetermined level, there might result burning or discoloration to be tinged with brown or a brownish color, and the melamine foam might be decomposed. It is preferred to conduct the heat compression at a temperature within the range lower than the sublimation or decomposition temperature of the foam-forming melamine by 130 to 20° C., more preferably 120 to 40° C. Heat compression conducted at a temperature within the range serves to sufficiently improve strength and reduce fragility of the molded foam without causing the problems of burning or discoloration and without decomposition of the foam.

Additionally, the technical meaning of employing 3 minutes or longer as the heat compression time, and the preferred heat compression time are the same as with the fourth aspect of the invention.

Additionally, in both the fifth aspect and the sixth aspect of the invention, it is preferred to compress-mold the melamine foam to a thickness of $\frac{1}{1.2}$ to $\frac{1}{12}$ as with the seventh aspect of the invention. Problems to be involved when the degree of compression is outside the preferred range and a preferred range of the degree of compression are the same as with the second aspect of the invention.

In particular, it is preferred, as with the 8th aspect of the invention, to conduct the heat compression molding in a metal mold having an uneven area in at least part of the molding surface with the melamine foam in contact with the uneven area-containing molding surface. By conducting heat compression molding in a metal mold having an uneven area in at least part of the molding surface, an uneven area can be formed in at least part of the surface of the melamine molded foam simultaneously with compression. Thus, the steps for producing the molded foam can be reduced in number. In addition, the melamine molded foam of the fourth aspect of the invention can easily be obtained.

Further, by forming the uneven area simultaneously with heat compression molding, the uneven area acquires a large strength and an improved durability. Therefore, in the case of using the molded foam as a wiper, unevenness on a stained surface can be scratched with a stronger force. Thus, dirt can be sufficiently removed even by a molded foam having a comparatively small uneven area. Further, there can be obtained more improved heat-insulating properties and sound attenuation properties.

In contrast, those which have been subjected to formation of unevenness by machining or cutting (including profiling and CF cutting) after the heat compression molding suffer partial dropping of the corner of unevenness upon rubbing the dirt off, thus being inferior in durability.

Further, as in the 9th aspect of the invention, the heat-compression molding may be conducted with the melamine foam in contact with the uneven area-containing surface of a molding attachment which has an at least partly uneven surface. By using the molding attachment, the uneven area can easily be formed on the melamine foam even in a conventional metal mold having a smooth molding surface. In addition, shape of the uneven area can easily be changed depending upon the use or size of the melamine molded foam by using a molding attachment having a different shape.

Such molding attachment is not particularly limited, and any one that can form the uneven area may be used. For example, there may be used a punching metal, wire or a wire net. Materials for these attachments are exemplified by metals and heat-resistant resins. In addition, there may be used a net formed by intertwining fibers such as glass fibers and impregnating them with a heat-resistant resin such as a heat-resistant polyester. Attachments made of a metal have an excellent thermal conductivity and an excellent heat resistance upon heat compression at an elevated temperature, thus being preferred. Attachments made of a resin have a light weight and is excellent in workability upon disposing in a mold, and are inexpensive, thus being preferred where the heat compression temperature employed being comparatively low. The intertwined fibers impregnated with a heat-resistant resin have an improved strength and show a good durability in addition to the advantages with the resin-made attachments.

The wiper, which is the tenth aspect of the invention, has a washing portion comprising the melamine molded foam described in one aspect of the invention of from the first to the fourth aspects thereof. The melamine foam retains a cell structure wherein microcells are connected to each other even after being heat-compressed, thus being easily impregnated with a liquid such as water or a detergent and, in addition, the melamine resin itself has a high hydrophilicity, thus being excellent in water absorption properties. Therefore even when heat-compressed, particularly even when the uneven area is formed at the surface of the melamine foam by heat compression as with the 8th and the 9th aspects of the invention, dirt can easily be removed by wiping with the aid of the washing action of an impregnated liquid such as water or a detergent or by dry rubbing, thus an extremely excellent washing effect being obtained. In addition, wiping marks are not conspicuous, either, when a liquid is used in combination for removing dirt.

On the other hand, in the case of using a urethane foam as a washing portion, the urethane resin itself has an inferior hydrophilicity and, when heat-compressed, the urethane foam becomes inferior in water absorption properties, because cells in the surface portion of the foam are crushed and there remain no openings, thus the surface being covered with a film. Therefore, a heat-compressed urethane foam might not exhibit enough function in wiping dirt off or in washing using a liquid.

The above-described "wiper" may comprise only the "washing portion" composed of the melamine molded foam, or may comprise a multi-layer structure having the washing portion as with the 11th aspect of the invention, or having provided thereon other member or members. For example, the wiper may have at least one of a urethane sponge layer, a cellulose sponge layer, an unwoven fabric layer and an abrasive layer. In addition, the wiper may have other washing member bonded thereon or may have a handle made of a plastic.

As the abrasive layer, there are illustrated those which comprise hard fibers (e.g., metal fibers or glass fibers). This washing portion comprising the melamine molded foam enables to easily remove dirt and, when rubbed against the surface to be washed, does not come off in a particulate form, and does not damage the surface to be washed. Hence, it can be used for the case where formation of flaw or reduction in luster particularly matters, such as the case of washing a body of an automobile or removing stains from furniture in addition to the case of washing a wall, a floor, and the like. In addition, while conventional melamine molded foams require to be coalesced with another material having a high strength in order to improve strength of the holding portion due to their insufficient strength and serious fragility, the melamine molded foams eliminate the necessity of coalescing with another material having a high strength due to the high strength increased by heat compression. Thus, members having various functions may be bonded or laminated to the molded foam with no limitation depending upon the end use thereof.

Further, notches may be formed as a broken line in the wiper. The notches enable to cut the wiper by hand into a smaller size properly selected depending upon the object to be washed. Thus, the work of cutting with scissors or the like can be omitted. The notches may be formed simply and inexpensively by a method of, for example, punching using a Thomson blade.

The invention is now described in detail by reference to Examples.

EXAMPLE 1

(1) Evaluation of strength, fragility and resistance to moist heat aging:

As a melamine foam to be heat-compressed, a commercially available product (made by BASF; trade name: "Basotect"; density: about 9.5 kg/m$^3$) was used.

400×400 mm test pieces were cut out of the melamine slab foam, heat-compressed at 270° C. for 4 minutes to obtain melamine molded foams having a thickness of ¼ or ¹⁄₁₀ of the test pieces. Strength, fragility and resistance to moist heat aging of these compressed foams were evaluated in comparison with those of a non-compressed foam. Heat compression was conducted using a hydraulic press type compression molding machine of 210 kg/cm$^2$ in maximum working pressure and 37 tons in maximum clamping force. Degree of compression was adjusted by using melamine slab foams different in thickness.

Evaluating method is as follows.
(1) Density (kg/cm$^3$): measured according to JIS K 6400-1997.
(2) Thermal conductivity (W/mK): measured in conformity to JIS A 1412-1999.
(3) Scratch test:
A cutting edge of a cutter was softly placed on the surface of a round-shaped sample, the sample was rotated with applying a predetermined load to the cutting edge, and it was observed with the naked eye whether flaws were formed on the surface of the sample or not. When no flaws were formed, the load was increased gradually to find a load (g) which first formed flaw, which load was taken as the result. Thus, the larger the value, the more difficult it becomes to form flaws.
(4) Resistance to moist heat aging:
After being exposed to an atmosphere of 70° C. in temperature and 95% in relative humidity for 48, 168, 504 or 1,000 hours, samples were subjected to measurement of tensile strength (MPa) and elongation (%) according to JIS K 6400-1997 (rate of pulling: 500 mm/min), and strength-retaining ratio based on the tensile strength before moist heat aging was calculated according to the following formula, which was taken as an indication of the resistance to moist heat ageing.

Strength-retaining ratio (%)=(Tensile strength after being exposed to the moist heat aging atmosphere for a predetermined period of time/Tensile strength before moist heat aging)×100
(5) Tear strength (N/cm): measured according to JIS K 6400-1997.
(6) Tensile strength (MPa): measured according to JIS K 6400-1997.
(7) Elongation (%): measured according to JIS K 6400-1997.

Results of (1) to (7) are shown in Table 1. Numerals within the parentheses attached to numerals for tensile strength in Table 1 are strength-retaining ratios (unit: %). Additionally, the strength-retaining ratios are also shown in FIG. 1.

TABLE 1

|  |  |  | ¼ Compressed Foam | ¹⁄₁₀ Compressed Foam | Non-compressed Foam |
|---|---|---|---|---|---|
| Density (kg/cm$^3$) |  |  | 16.5 | 39.4 | 8.8 |
| Thermal conductivity (W/mK) |  |  | 0.0308 | 0.0311 | 0.0355 |
| Scratch test (g) |  |  | 90 | 110 | 70 |
| Resistance to Moist Heat Aging | Tensile Strength (MPa) | 0 hr | 0.247 (100) | 0.625 (100) | 0.158 (100) |
|  |  | 48 hr | 0.285 (115) | 0.625 (100) | 0.139 (88) |
|  |  | 168 hr | 0.262 (106) | 0.565 (90) | 0.132 (84) |
|  |  | 504 hr | 0.265 (107) | 0.526 (84) | 0.123 (78) |
|  |  | 1000 hr | 0.222 (90) | 0.383 (61) | 0.054 (34) |
|  | Elongation (%) | 0 hr | 20 | 30 | 20 |
|  |  | 48 hr | 20 | 20 | 40 |
|  |  | 168 hr | 20 | 20 | 40 |
|  |  | 504 hr | 20 | 20 | 30 |
|  |  | 1000 hr | 23 | 20 | 40 |
| Tear strength (N/cm) |  |  | 0.59 | 1.23 | 0.11 |

According to the results shown in Table 1, thermal conductivity is reduced by the heat compression, and the heat-compressed foams are surmised to be useful as heat-insulating materials. The results of the scratch test revealed that fragility of the surface was reduced so much that the surface was not broken even when rubbed strongly. Further, as is shown in FIG. 1, tensile strength retention ratio after exposing in a moist heat atmosphere for 1,000 hours was 90% with the ¼-compressed foam, or 61% with the ¹⁄₁₀-compressed foam and, in particular, it is seen that the ¼-compressed foam kept enough strength after moist heat aging. On the other hand, the non-compressed foam suffered a reduction in the retention ratio to 34% after 1,000 hours, thus being inferior. These results demonstrate improvement of resistance to moist heat aging by the heat compression.

(2) Relation between temperature, time and degree of compression in the heat compression and strength-retaining ratio:

The same melamine foam as used in (1) was heat-compressed using the same model compression molding machine, and relation between temperature, time and degree of compression in the heat compression and the strength-retaining ratio after exposing to the moist heat atmosphere for 1,000 hours was examined in the same manner as in (1). Results thus obtained are shown in Table 2.

TABLE 2

|  | Heating Temperature (° C.) | Heating Time (min) | Degree of Compression | Strength-retaining Ratio (%) |
| --- | --- | --- | --- | --- |
| Experiment 1 | 250 | 10 | 1/5 | 85 |
| Experiment 2 | 250 | 15 | 1/5 | 85 |
| Experiment 3 | 290 | 7 | 1/3 | 75 |
| Experiment 4 | 290 | 17 | 1/10 | 70 |

It is seen from the results in Table 2 that a strength-retaining ratio of 70 to 85% can be attained by conducting the heat compression under the conditions of 250° C. or 290° C. in temperature, 7 to 17 minutes in heating time and ⅓ to ¹⁄₁₀ in degree of compression and, thus, that the melamine molded foams had enough resistance to moist heat aging regardless of the temperature, time and degree of compression in the heat compression. In addition, the molded foam having been heat-molded under the conditions of Experiment 2 was allowed to stand at 23° C. for 200 hours, and its dimensional recovery ratio was measured to be 3% or less, thus the foam being confirmed to have undergone sufficient plastic deformation.

(3) Evaluation of tensile strength and elongation of the molded foams obtained by changing the heat-compressing conditions:

The same melamine foam as used in (1) was heat-compressed in the same manner as in (1) using the same model compression molding machine except for changing the heat compression conditions to 230° C. in temperature and 10 minutes in compressing time to prepare melamine molded foams having a thickness of ½ or ⅓ of that of the test piece, followed by evaluating tensile strength and elongation in the same manner as in (1) Results thus obtained are shown in Table 3.

TABLE 3

|  | 1/2-Compressed Foam | 1/3-Compressed Foam | Non-compressed Foam |
| --- | --- | --- | --- |
| Tensile Strength (MPa) | 0.312 | 0.476 | 0.142 |
| Elongation (%) | 20 | 20 | 20 |

It is seen from the results in Table 3 that, even when heat-compressed at 230° C. for 10 minutes to a degree of compression of ½ or ⅓, the compressed foams showed an improved tensile strength in comparison with that of non-compressed foam. The results reveal that sufficient improvement of strength can be attained by heat compression. In addition, the foams showed an increased practical strength and an improved durability when heat-compressed to the form of the same shape, size and thickness as those of the conventional foams.

EXAMPLE 2

(1) Production of a heat-compressed molded foam having an uneven area:

In conducting heat compression, a mold having a flat molding surface was used and, as a molding attachment, a wire net made of a heat-resistant resin (mesh opening: 5 mm; diameter of net-forming wire: about 1 mm) was used.

A melamine foam (thickness: 20 mm) was placed on the molding surface of a metal mold, and the molding attachment was placed thereon, followed by heat-pressing the assembly at 230° C. for 10 minutes with a spacer (width: 12 mm) being disposed around the melamine foam. Thus, there was obtained a ½-compressed molded foam having a mesh-like uneven pattern on the surface.

Additionally, for comparison, there was obtained a ½-compressed molded foam having no uneven areas without using the molding attachment.

(2) Evaluation of stain-removing properties of the heat-compressed molded foam having the uneven area:

Stain-removing properties of the ½-compressed molded foam obtained in the above (1) and having the uneven area and a comparative sample of a ½-compressed molded foam were measured in the following manner by reference to "rubbing" test provided in JASO M313-83. Results thus obtained are shown in Table 4.

Testing Method

The test was conducted using a crockmeter provided in JIS L 0823-1965 (crockmeter for testing dyeing fastness), wherein a melamine foam test specimen (size: 5×3 cm) was adhered to a friction element of the tester with a double-sided pressure-sensitive adhesive tape and was further fixed to the element by applying a rubber band thereon, thus being fixed to the tester.

Then, a stainless steel plate, on which transverse lines were drawn with an oily ink at 2 mm intervals over 3 cm, was placed on a testing stand, and the friction element (to the surface of which was fixed the melamine foam specimen) was mounted thereon and fixed so that the transverse lines drawn with the oily ink came into contact with the melamine foam.

The friction element was reciprocated 100 times at a rate of 30 reciprocations, per minute over a distance of 100 mm on the stainless steel plate while applying a load of 500 g through the friction element, and degree of removal of the oily ink by the melamine foam was evaluated with the naked eye.

TABLE 4

| Sample | Evaluation of friction cleaning properties |
| --- | --- |
| 1/2-Compressed foam | Lines of the oily ink were removed to some extent. |
| 1/2-Compressed foam (with uneven area) | Lines of the oily ink were removed very well. |

It is seen from the results in Table 4 that stain-removing properties are improved by forming an uneven area on the surface through heat compression, and that the thus compressed foam is excellent as a wiper. In addition, since the uneven area is formed with a high strength by heat compression, the foam has a high durability.

EXAMPLE 3

(1) Specific example of a wiper having an uneven area:

A wiper 1 having an uneven area and having the following structure was prepared. Description is given by reference to FIG. 2A. The wiper 1 is constituted by three layers, that is, a melamine foam layer 11 on one side having the uneven area 111 on the surface, a thin urethane sponge layer 12b on the opposite side, and a urethane sponge layer 12a sandwitched therebetween.

A proper hardness and a proper softness suited for rubbing with the wiper in hand for washing are imparted by bonding the three layers. In addition, three, broken-lined notches 2 are formed vertically in a longitudinal direction. The notches enable to easily cut the wiper by hand into smaller pieces.

Figure 2B:
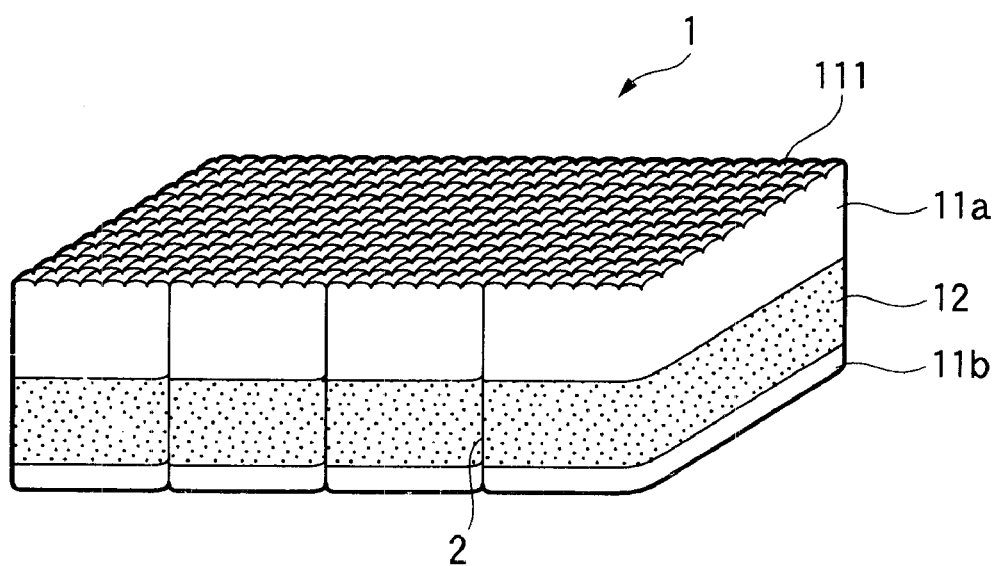
FIG. 2B is a perspective view showing another example of applying the melamine molded foam to a wiper.

(2) Another specific example of a wiper having an uneven area:

Another wiper 1 having an uneven area and having the following structure was prepared. Description is given by reference to FIG. 2B. The wiper 1 is constituted by three layers, that is, melamine foam layers 11a and 11b having the uneven area 111 on the surface, and a urethane sponge layer 12 sandwitched therebetween.

Since this wiper has the uneven area on the surface of the melamine foam layer on both sides, good stain-removing properties can be obtained by using either surface thereof. The melamine foam layer 11a on one side has a smaller degree of compression and is softer than that of the melamine foam layer 11b on the opposite side. Thus, a proper surface may be selected depending upon the place to be washed.

Additionally, the invention is not limited to the above-described specific examples and permits various changes within the scope of the invention depending upon the end-use. For example, the ¼-compressed foam and ¹⁄₁₀-compressed foam shown in Table 1, the molded foams of Experiments 1 to 4 in Table 2, the ½-compressed foam and the ⅓-compressed foam in Table 3, and the ½-compressed foam having the uneven area in Table 4 can be utilized as cleaners by forming into a given form as in Example 3 by using a mold or the like. In addition, since the cleaners have an enough strength even in a thickness as thin as about 1 to about 3 mm, they may be used as thin, small, portable and disposable cleaners.

The first aspect of the present invention enables to provide a melamine molded foam having an improved strength and reduced fragility of melamine foam and having an enough resistance to moist heat aging. In addition, the fifth to sixth aspects of the invention enable to easily produce the melamine molded foam of the first aspect of the invention having the excellent properties by specifying temperature and time of the heat compression. Further, the 10th aspect of the invention provides a cleaner showing excellent action of removing stains without forming flaws on the surface to be washed and having an excellent durability. The fourth aspect of the invention provides more excellent stain-removing properties by forming an uneven area on at least part of the surface of the melamine molded foam. The 8th and the 9th aspect of the invention enable to easily form the uneven area on at least part of the surface of the melamine molded foam.

While the invention has been described in detail and with reference to specific embodiments thereof, it will be apparent to one skilled in the art that various changes and modifications can be made therein without departing from the spirit and scope thereof.

This application is based on Japanese patent application No. 2001-055817 filed on Feb. 28, 2001, the entire contents thereof being hereby incorporated by reference.

What is claimed is:

1. A wiper having a washing portion comprising melamine molded foam, wherein said melamine foam is produced by heat-compressing a melamine foam at 210 to 350° C. for 3 minutes or longer to cause plastic deformation, and wherein said melamine foam has a dimensional recovery ratio of 40% or less when allowed to stand at 23° C. for 200 hours.

2. The wiper as claimed in claim 1, wherein the melamine foam is compressed to a thickness of $\frac{1}{1.2}$ to $\frac{1}{12}$.

3. The wiper as claimed in claim 1, which has an uneven area in at least part of the surface thereof.

4. A process for producing a melamine molded foam, which comprises heat-compressing a melamine foam at a temperature lower than the decomposition temperature of the melamine monomer constituting the melamine foam by 140° C. or less for 3 minutes or longer to cause plastic deformation.

5. The process for producing a melamine molded foam as claimed in claim 4, wherein the melamine foam is compressed to a thickness of $\frac{1}{1.2}$ to $\frac{1}{12}$.

6. The wiper as claimed in claim 1, wherein the heat-compression molding is conducted in a metal mold having an uneven area in at least part of the molding surface with the melamine foam in contact with the uneven area-containing molding surface.

7. The process for producing a melamine molded foam as claimed in claim 4, wherein the heat-compression molding is conducted in a metal mold having an uneven area in at least part of the molding surface with the melamine foam in contact with the uneven area-containing molding surface.

8. The wiper as claimed in claim 1, wherein the heat-compression molding is conducted with the melamine foam in contact with the uneven area-containing surface of a molding attachment which has the at least partly uneven surface.

9. The process for producing a melamine molded foam as claimed in claim 4, wherein the heat-compression molding is conducted with the melamine foam in contact with the uneven area-containing surface of a molding attachment which has the at least partly uneven surface.

10. The wiper as claimed in claim 1, which has the washing portion and a multi-layer structure.

* * * * *